(12) United States Patent
Goldman et al.

(10) Patent No.: US 10,385,767 B2
(45) Date of Patent: Aug. 20, 2019

(54) FORMAT-SPECIFIC BIDS BASED ON GOAL-ORIENTED TARGETING OF CONTENT

(75) Inventors: Jonathan Goldman, San Francisco, CA (US); Thomas J. Broxton, San Francisco, CA (US); Lane P. Shackleton, San Francisco, CA (US); Reto Strobl, Walenstadt (CH); Thomas Weich, Zurich (CH); Baljeet Singh, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1794 days.

(21) Appl. No.: 13/241,561

(22) Filed: Sep. 23, 2011

(65) Prior Publication Data

US 2018/0371984 A1    Dec. 27, 2018

(51) Int. Cl.
  *G06Q 30/02* (2012.01)
  *F02B 39/10* (2006.01)
(52) U.S. Cl.
  CPC ............. *F02B 39/10* (2013.01); *G06Q 30/02* (2013.01)
(58) Field of Classification Search
  USPC .......................................................... 705/14
  See application file for complete search history.

(56) References Cited

U.S. PATENT DOCUMENTS

| | | | |
|---|---|---|---|
| 7,792,723 | B2 | 9/2010 | Molloy |
| 8,195,523 | B1 | 6/2012 | Lark et al. |
| 2006/0190387 | A1 | 8/2006 | Molloy |
| 2006/0190388 | A1 | 8/2006 | Molloy |
| 2006/0190389 | A1 | 8/2006 | Molloy |
| 2010/0250332 | A1 | 9/2010 | Ghosh et al. |
| 2010/0262497 | A1 | 10/2010 | Karlsson |
| 2010/0332404 | A1 | 12/2010 | Valin |
| 2011/0231265 | A1* | 9/2011 | Brown et al. ............... 705/14.73 |
| 2012/0041816 | A1* | 2/2012 | Buchalter .................. 705/14.41 |

FOREIGN PATENT DOCUMENTS

| | | |
|---|---|---|
| WO | WO 2007/052285 | 5/2007 |
| WO | WO 2010/118201 | 10/2010 |
| WO | WO 2010/132571 | 11/2010 |

* cited by examiner

*Primary Examiner* — Patricia H Munson
(74) *Attorney, Agent, or Firm* — Foley & Lardner LLP

(57) ABSTRACT

Methods, systems, and apparatus, including computer programs encoded on a computer-readable storage medium, including a method for determining bids for campaigns. The method comprises receiving an indication from a sponsor to create a video campaign and presenting a user interface for the sponsor to designate a goal for the video campaign. The goal is expressed in terms of a balance between maximizing any views versus engaged views. Engaged views arise when a user indicates their desire to view a video content item or where the user performs one or more actions related to the video content item while or after viewing the video content item. The method further comprises receiving a sponsor selection of a goal, receiving a maximum bid to be applied to all video campaign formats, automatically determining an adjusted maximum bid for each format based on the maximum bid and sponsor goal selection, and storing the campaign.

10 Claims, 5 Drawing Sheets

FORMAT-SPECIFIC BIDS BASED ON GOAL-ORIENTED TARGETING OF CONTENT

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors through an auction. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content. Some content slots can have different formats.

SUMMARY

In general, one innovative aspect of the subject matter described in this specification can be implemented in methods that include a method for determining bids for campaigns. The method comprises receiving an indication from a sponsor to create a video campaign. The method further comprises presenting a user interface to allow the sponsor to designate a goal for the video campaign where the goal is expressed in terms of a balance between maximizing any views or alternatively maximizing engaged views, where an engaged view is one that arises when a user indicates their desire to view a video content item or where the user performs one or more actions related to the video content item while or after viewing the video content item. The method further comprises receiving a sponsor selection of a goal. The method further comprises receiving a maximum bid to be applied to all formats in the video campaign. The method further comprises automatically determining an adjusted maximum bid for each format based at least in the part on the maximum bid and the sponsor goal selection. The method further comprises storing the campaign including the adjusted maximum bids for each format.

These and other implementations can each optionally include one or more of the following features. The actions related to the video content item can be selected from the group comprising rating the video content item, sharing the video content item, commenting on the video content item, or subscribing to a channel associated with a sponsor of the video content item. Presenting the user interface can include presenting a slider control for enabling selection of the goal. The slider control can enable selection of a balance of views versus engaged views. The method can further comprise presenting the adjusted maximum bids to the sponsor. The method can further comprise presenting controls to enable the sponsor to manually adjust one or more of the automatically-determined adjusted maximum bids. The method can further comprise receiving sponsor input reflecting a further adjustment to one of the automatically-adjusted maximum bids and storing the further adjustment in the campaign. The method can further comprise presenting a control to enable resetting of the further adjustment to a level associated with the automatic adjustment. The control can be a slider on a slider bar that is used to designate the sponsor's goal. The method can further comprise enabling the campaign and targeting content to users based on requests for content in conformance with the campaign and the adjusted maximum bids for each format. The formats for the campaign can be selected from the group comprising a search-result-embedded format, a selected-from-group format, an in-display embedded format or an in-stream-embedded format.

In general, another innovative aspect of the subject matter described in this specification can be implemented in systems that include a system that provides content items responsive to received requests. The system includes a content management system for providing content items in response to content item requests and based on bids. The content items include video advertisements having different formats and different bids for each of the different formats. The system further includes a sponsor interface. The sponsor interface allows a sponsor to designate a goal for a video campaign where the goal is expressed in terms of a balance between maximizing any views or alternatively maximizing engaged views, where an engaged view is one that arises when a user indicates their desire to view a video content item or where the user performs one or more actions related to the video content item while or after viewing the video content item. The sponsor interface further allows a sponsor to provide a maximum bid to be applied to all formats in the video campaign. The sponsor interface automatically determines an adjusted maximum bid for each format based at least in the part on the maximum bid and the sponsor goal selection and stores the campaign including the adjusted maximum bids for each format.

In general, another innovative aspect of the subject matter described in this specification can be implemented in computer program product that include a computer program product tangibly embodied in a computer-readable storage device and comprising instructions that, when executed by a processor, perform a method for providing content. The method comprises receiving an indication from a sponsor to create a video campaign. The method further comprises presenting a user interface to allow the sponsor to designate a goal for the video campaign where the goal is expressed in terms of a balance between maximizing any views or alternatively maximizing engaged views, where an engaged view is one that arises when a user indicates their desire to view a video content item or where the user performs one or more actions related to the video content item while or after viewing the video content item. The method further comprises receiving a sponsor selection of a goal. The method further comprises receiving a maximum bid to be applied to all formats in the video campaign. The method further comprises automatically determining an adjusted maximum bid for each format based at least in the part on the maximum bid and the sponsor goal selection. The method further comprises storing the campaign including the adjusted maximum bids for each format.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
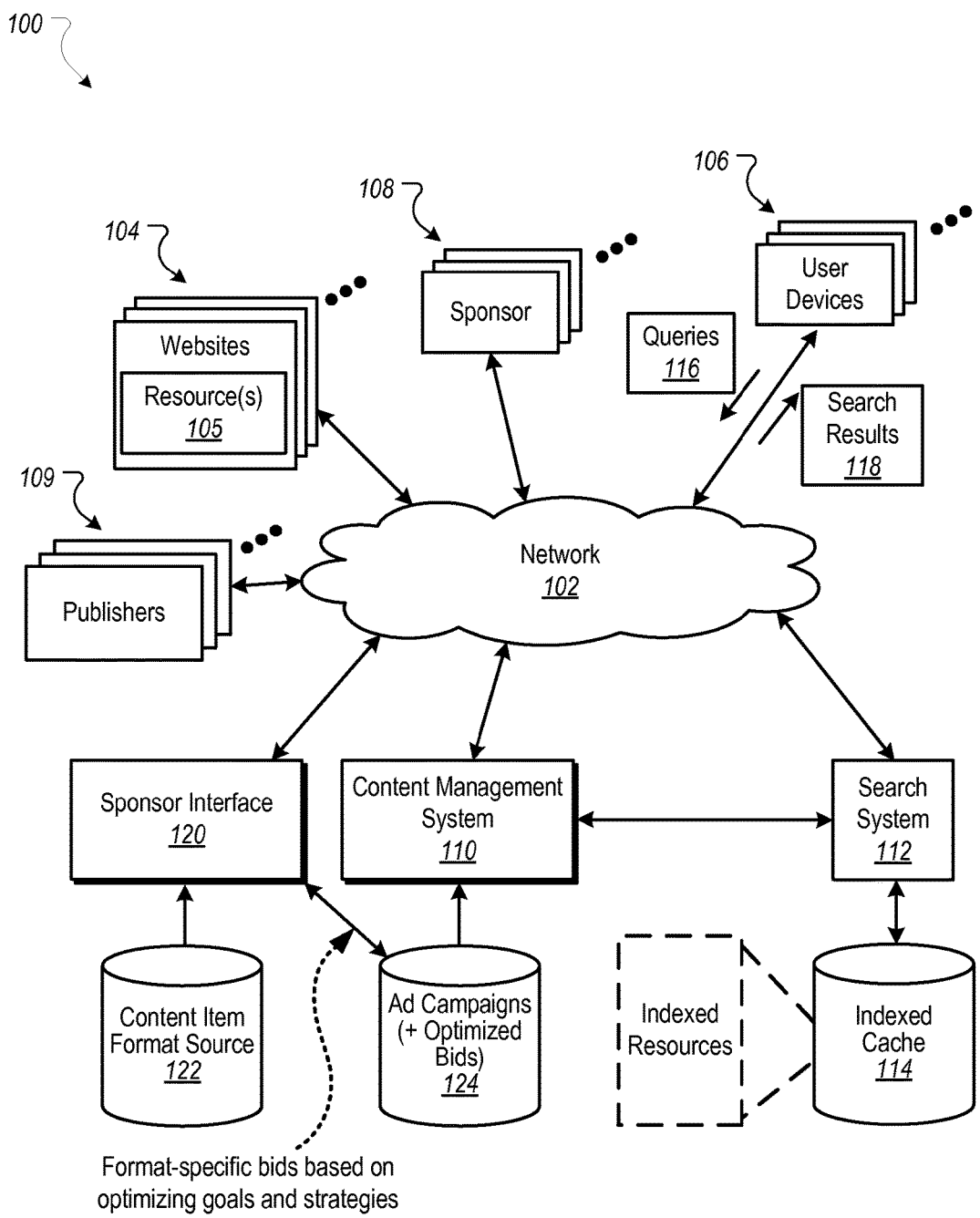
FIG. 1 is a block diagram of an example environment for serving content.

This document describes methods, processes and systems for goal-oriented targeting and bids by sponsors on different video formats. Because auctions for different video formats can clear at significantly different bids, it can be beneficial to allow sponsors to set multiple format-specific bids instead of one uniform bid across all formats. For example, a sponsor of video content (e.g., video advertisements, or "ads") can use a sponsor interface to establish bidding strategies, e.g., to designate an optimizing goal that is used to set bids for goal-oriented targeting, including specifying different maximum bid amounts for different video formats (or "formats"). The goal and bidding interface can be part of a sponsor interface that the sponsor uses to create video campaigns. In some implementations, the sponsor interface or some other user interface can be displayed when the sponsor wants to change the bids that previously have been set for different formats, e.g., to change a balance in how the bids are optimized. In some implementations, e.g., based on what the sponsor identifies for optimizing, the sponsor interface can automatically set bid amounts for the different formats. Example optimizations can include optimizations for campaigns that target number of views or level of engagement of the views. Views and engagement are discussed in greater detail below.

Different types of video formats can exist, including, but not limited to, a search-result-embedded format (e.g., a video that is provided as part of a search result), a selected-from-group format (e.g., a video that is provided in response to a selection made from a slate of available videos), an in-display format (e.g., a video that is provided as a user-selectable thumbnail within a banner or other display), or a stream-embedded format (e.g., a video that is provided before, during or after another content item in a stream). Other formats are possible. Each format can provide a different context in which the video content item is presented. By way of example, search-result-embedded videos can include videos that consist of a user-selectable thumbnail image or icon that appears inside a search result. Selected-from-group videos can include videos that result from user selection of a single thumbnail from a group (or slate) of thumbnails of videos. In-display videos can include videos that appear as a user-selectable thumbnail in a banner (e.g., at the top of a web page) or in some other type of display. Stream-embedded videos can include short (e.g., 15-second, 30-second, etc.) videos that play before, during or after other video content (e.g., referred to as "pre-rolls," "mid-rolls," or "post-rolls"). Other formats are possible, and the methods, systems, user interfaces, etc. that are described in this document can be adapted for the other formats, including formats that apply to mobile devices.

For example, the sponsor interface can present information and controls that allow the sponsor to designate an optimizing goal for a video campaign. The optimizing goal can be expressed, for example, in terms of a balance between maximizing any views and alternatively maximizing engaged views. For example, an engaged view can include a view coupled with additional user actions that occur during or after viewing a video content item.

In some implementations, engaged views can include or be associated with different types of user actions. Example user actions include starting the video, watching all or part of the video, subscribing to a web site or other resource associated with the video (e.g., after clicking to a landing page of the video's sponsor), making a designation to "follow" the video, "liking" the video (e.g., in a social networking environment), sharing or promoting the video (e.g., with friends in a social network), designating the video as a "favorite," and so on. In some implementations, engaged views can include engagements in general, including one or more of the different types of user actions described above. In some implementations, sponsors can use a sponsor interface to designate bids for different formats with respect to the different types of engagements or user actions, as will be described below. In some implementations, the sponsor interface can allow the sponsor to set optimizing goals for different levels of engagement, e.g., to target content items to users based on the users' likelihood to perform certain user actions during engagement with a video content item.

In some implementations, the sponsor interface can allow the sponsor to specify a maximum bid that is to be applied to all formats in the video campaign. Using the user-designated optimizing goal (e.g., views versus engagements), maximum bids for each format can be determined automatically at or below the maximum bid. For example, when the sponsor specifies an optimizing goal that is optimized for total user views of any kind, the maximum bids for formats that are less expensive can be higher than bids for formats that are more likely to lead to user engagements. In another example, when the sponsor specifies a goal that is optimized for engagements, the maximum bids for formats that are more expensive can be higher than bids for other formats that are less likely to lead to user engagements. In some implementations, bids that are automatically determined for a format type can be set using a bid amount that is expected to win a predetermined amount (e.g., 90% or some other percentage) of auctions using that bid (noting the automatic bid is still bound by the maximum bid specified by the sponsor).

In some implementations, the sponsor can accept the automatically-determined bids as-is, or the sponsor can elect to manually change one or more bids for the different formats. When the sponsor is satisfied with the bid amounts (e.g., either for a new campaign or one for which bids are being modified), the bids for the campaign can be stored, including the adjusted maximum bids for each format. The bids can then be used in environments in which content is served, including video content items that are targeted based on the optimized goals and different formats.

FIG. 1 is a block diagram of an example environment 100 for serving content. The example environment 100 includes a content management system 110 (e.g., for selecting and providing content in response to requests for content) and a sponsor interface 120 for accepting sponsor bids and targeting goals for campaigns. The example environment 100 includes a network 102, such as a local area network (LAN), a wide area network (WAN), the Internet, or a combination thereof. The network 102 connects websites 104, user devices 106, sponsors (e.g., campaign sponsors or advertisers 108), publishers 109, the content management system 110, and the sponsor interface 120. The example environment 100 may include many thousands of websites 104, user devices 106, and sponsors (e.g., campaign sponsors or advertisers 108).

The sponsor interface 120, for example, can allow a sponsor to provide optimizing goals and format-specific bids for a selected campaign. In some implementations, the sponsor interface 120 can access information from content item format source 122. In some implementations, the content item format source 122 can include information related to bid amounts (e.g., for each format type) that are likely to provide specific results relative to a sponsor's strategy, such as maximizing views and/or engagements of various types. In some implementations, the sponsor interface 120 can store format-specific bids based on optimizing goals and strategies in a data store of campaigns and optimized bids 124, e.g., with other information associated with the campaigns. An example sponsor interface is described below with reference to FIGS. 2A-2B.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., video content items) can be presented.

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. However, in applications in which search queries 116 are not used, the content management system 110 can use other ways of selecting content, e.g., selecting ads based on the format type of a particular ad slot and further based on the bid amounts for ads having that format type.

The content management system 110 can select from the eligible content items that are to be provided for presentation in slots of a resource or search results page based at least in part on results of an auction. For example, for the eligible content items, the content management system 110 can receive bids from sponsors (e.g., campaign sponsors or advertisers 108) and allocate the slots, based at least in part on the received bids (e.g., based on the highest bidders at the conclusion of the auction). The bids are amounts that the sponsors are willing to pay for presentation (or selection) of their content with a resource or search results page. For example, a bid can specify an amount that a sponsor is willing to pay for each 1000 impressions (i.e., presentations) of the content item, referred to as a CPM bid. Alternatively, the bid can specify an amount that the sponsor is willing to pay for a selection (i.e., a click-through) of the content item or a conversion following selection of the content item. The selected content item can be determined based on the bids alone, or based on the bids of each bidder being multiplied by one or more factors, such as quality scores derived from content performance, landing page scores, and/or other factors.

Figure 2A:
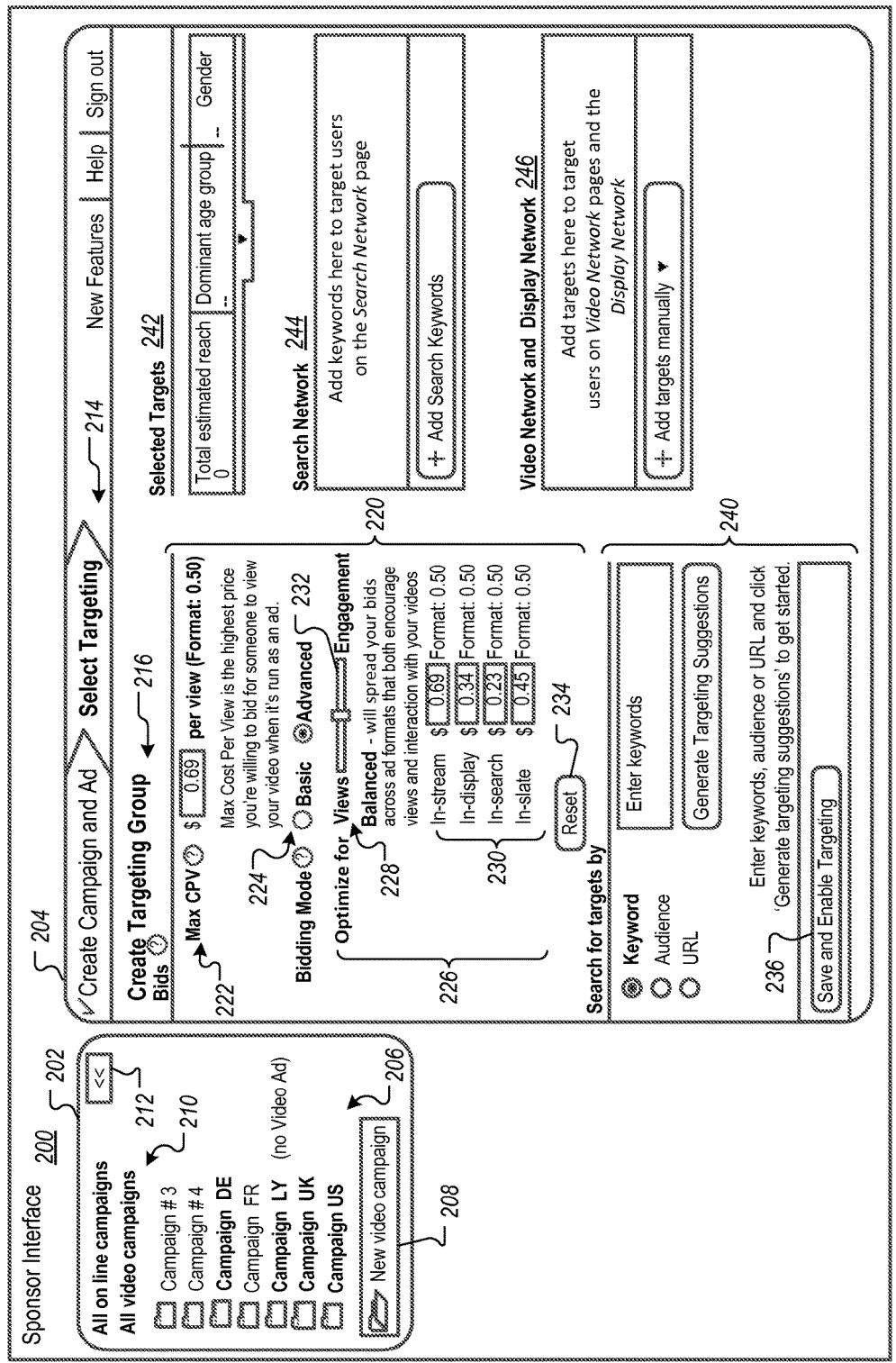
FIGS. 2A-2B show example sponsor interfaces for goal-oriented targeting and bidding using different video formats.

FIG. 2A shows an example sponsor interface 200 for goal-oriented targeting and bidding using different video formats. For example, a sponsor can use the sponsor interface 200 to select an optimizing goal used for automatically selecting proposed bid amounts for goal-oriented targeting and to specify different bids for different video formats (or "formats"). The sponsor interface 200 can be displayed on the user device 106, for example, after a sponsor has made an indication that the sponsor is creating or updating a video campaign. In some implementations, the sponsor interface 200 or some other user interface can be displayed when the sponsor wants to change the bids that previously have been set for different formats, e.g., to change a balance in how the bids are optimized. In some implementations, based on what the sponsor identifies for optimizing the campaign, the sponsor interface 200 can automatically set bid amounts for the different video formats.

The sponsor interface 200 can include a campaign selection area 202 for selecting a new or existing campaign and a targeting interface 204 for specifying or updating targeting information for the campaign. The campaign selection area 202, for example, can display a list of existing campaigns 206 and include at least one create new campaign control 208, e.g., a "New video campaign" option for creating a new video campaign and for defining the targeting parameters for the new campaign. In some implementations, campaign filter controls 210 can allow the sponsor to control what types of campaigns are displayed in, or selectable from, the campaign selection area 202 (e.g., all online campaigns, all video campaigns, etc.). In some implementations, a hide/expose control 212 can be used to hide or expose the campaign selection area 202, e.g., after a campaign has been selected by the sponsor and to provide more screen space for the targeting interface 204. In some implementations, the sponsor interface 200 can wait to display the targeting interface 204 until after the sponsor has provided an indication to create or modify a video campaign, e.g., by making a selection of a campaign in the campaign selection area 202.

In some implementations, the targeting interface 204 can be one of multiple screens that are used (e.g., in succession) to define a campaign. For example, the targeting interface 204 can include a hierarchical tabbed header 214, e.g., "Create Campaign and Ad . . . Select Targeting" that corresponds to the selection of "New Video Campaign" from the create new campaign control 208. Also, the targeting interface 204 includes a title 216 (e.g., "Create Targeting Group").

The targeting interface 204 includes a bid area 220 for specifying bids for content items within the campaign. For example, the sponsor can use a maximum cost-per-view field 222 to specify a maximum bid to be applied (e.g., as a maximum bid amount) to all formats in the video campaign. In some implementations, the maximum cost-per-view field 222 can be pre-populated based on the sponsor's campaign budget and/or a recommended or default cost-per-view.

Bidding mode controls 224 can allow the sponsor to select a type of bidding mode (e.g., "Basic" or "Advanced") for which to bid on impressions of videos within the campaign. If, for example, the sponsor selects "Basic" for the bidding mode, then the sponsor-specified bid in the maximum cost-per-view field 222 can be used for bidding on all format types. However, if the sponsor selects "Advanced" for the bidding mode, then the targeting interface 204 can additionally display an optimizing area 226 (e.g., which either does not appear for the "Basic" mode or is grayed out).

In some implementations, the optimizing area 226 can include optimization controls 228 that allow the sponsor to designate an optimizing goal for the video campaign. The optimizing goal, for example, can be expressed in terms of a balance between maximizing any views and maximizing engaged views (where engaged views include e.g., user actions that occur during or after viewing the video content item). The optimizing area 226 can also include format-specific bids 230 that can be set automatically based on sponsor selections of the optimization controls 228. The format-specific bids 230 can also be changed manually by the sponsor, e.g., for one or more formats. For example, the format-specific bids 230, as shown in FIG. 2A, can correspond to the stream-embedded, in-display, search-result-embedded and selected-from-group formats, respectively. In some implementations, per-impression costs in general for the different formats, in ascending order (lowest cost to highest cost) can include stream-embedded (least costly), selected-from-group, in-display, and search-result-embedded (most costly) formats.

In some implementations, the optimization controls 228 can include a slider control 232 for enabling selection of the goal, e.g., as a balance (or trade-off) of views versus engaged views. For example, the sponsor can slide the slider control 232 fully to the left (e.g., the "Views" end) to optimize the campaign for views, meaning that bids for different format types of the video can be set to maximize user views (e.g., impressions) of the video without regard to whether the user engages with the video. In another example, the sponsor can slide the slider control 232 fully to the right (e.g., the "Engagement" end) to optimize the campaign for engagements, meaning that bids for different format types of the video can be set to maximize user engagements.

In some implementations, the adjusted maximum bid for each format can be automatically determined based at least in the part on the maximum bid and the sponsor's goal selection. For example, setting or adjusting the slider control 232 can cause an automatic calculation or re-calculation of bid amounts for the format-specific bids 230, none of which are allowed to exceed the bid amount specified in the maximum cost-per-view field 222. In some implementations, sliding the slider control 232 to the center of the bar to select a balanced optimizing goal can result in, for example, format-specific bids 230 of $0.69, $0.34, $0.23 and $0.45 for the stream-embedded, in-display, search-result-embedded and selected-from-group formats, respectively. Using a balanced optimizing goal, for example, videos in the sponsor's campaign can be expected to result in impressions corresponding to a balanced mix of the different formats. In some implementations, sliding the slider control 232 to the far left to select an optimizing goal for maximum views can result in, for example, format-specific bids 230 of $0.69, $0.20, $0.10 and $0.56. In this example, there are higher bid amounts for stream-embedded and selected-from-group formats, yet lower bid amounts for in-display and search-result-embedded formats. In some implementations, sliding the slider control 232 to the far right to select an optimizing goal for maximum engagements can result in, for example, format-specific bids 230 of $0.10, $0.69, $0.60 and $0.20. In this example, there are higher bid amounts for search-result-embedded and in-display formats, yet lower bid amounts for selected-from-group and stream-embedded formats. Other automatically-determined bid amounts are possible for those and other positions on the slider control 232, including intermediate positions on either side of the center position.

In some implementations, a center position of the slider control 232 can be the default, e.g., when the targeting interface 204 is initially displayed for a new campaign. In some implementations, a default position of the slider control 232 can be depend on a sponsor's preferences or based on existing or historical campaigns.

In some implementations, the slider control 232 can include labeled tick marks or other types of settings that represent different levels of engagement and/or specific engagement activities such as subscriptions, follows, likes, shares, favorites, etc. For example, instead of sliding the slider control 232 to the right into a single, all-inclusive maximum engagement setting, the sponsor can select specific levels or types of engagement. In some implementations, the levels can be cumulative with regard to previous levels, e.g., one or more activities for a first engagement level can be pre-requisites for a second follow-on engagement level.

In some implementations, instead of (or in addition to) the slider control 232 having tick marks, other controls can be used. For example, the targeting interface 204 can include individual check boxes, each check box corresponding to a different type of user action (e.g., subscribing, following, liking, sharing, making a favorite, etc.). In some implementations, the sponsor can check any number of the checkboxes in order to achieve a desired optimization goal.

In some implementations, the format-specific bids 230 can be updated manually by the sponsor, e.g., in order to change an automatically-determined bid. In some implementations, updating one or more of the format-specific bids 230 can result in a change of appearance of the slider control 232, e.g., grayed out to indicate that a setting on the slider control 232 is no longer reflected by the format-specific bids 230. In some implementations, a reset control 234 enables a resetting of the manual adjustments made by the sponsor to the format-specific bids 230. For example, the reset control 234 can restore automatically-determined values that were based on the position of the slider control 232.

In some implementations, the targeting interface 204 can include various controls for saving and storing the sponsor's settings, including the maximum cost-per-view field 222 and format-specific bids 230. For example, selecting a save control 236 can cause the campaign to be stored (e.g., in the data store of campaigns and optimized bids 124), including the adjusted maximum bids for each format.

In some implementations, the targeting interface 204 can further include other areas in which the sponsor can select or define targeting criteria. For example, additional areas can include a targeting area 240 for selecting the target(s) of the campaign, a selected targets area 242 for displaying information about an estimated audience that the targeted campaign will reach, a search network area 244 for defining additional targeting options (e.g., keywords) for targeting one or more search networks, and a video/display network area 246 for defining additional targeting options (e.g., keywords) for targeting one or more video networks and display networks.

Figure 2B:
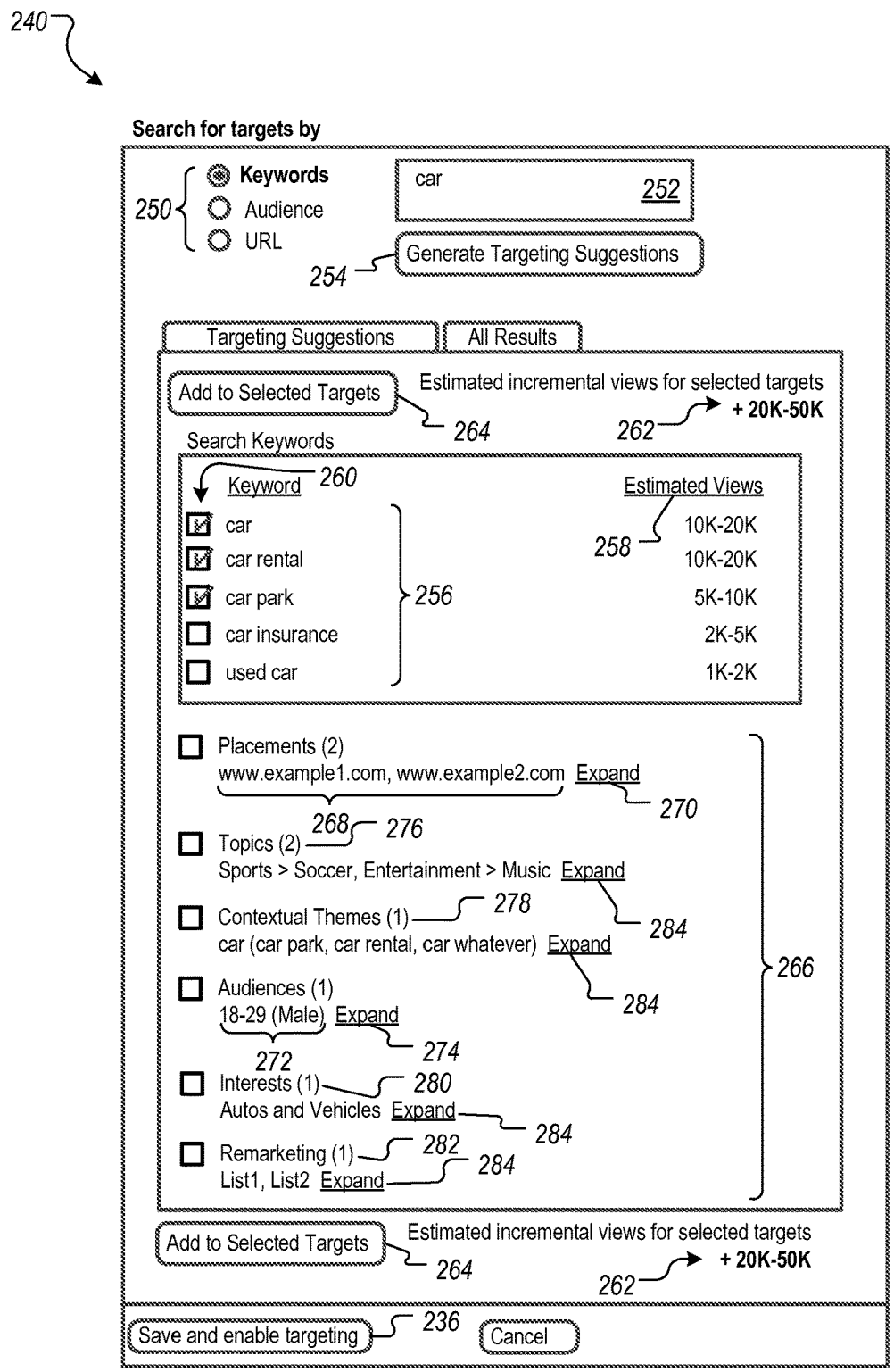

FIG. 2B shows an example expanded state of the targeting area 240 that can be used for goal-oriented planning. For example, in addition to the optimization goals described above, the sponsor can identify proposed keywords, a target audience and target websites for the campaign. A goal-oriented planning engine (e.g., part of content management system 110 of FIG. 1), for example, can analyze the sponsor's optimization goals (described above) in combination with the sponsor's proposed keywords, targeted audience and target websites to provide suggestions corresponding to the sponsor-identified targeting information. The suggestions, for example, can include additions and/or changes to the proposed keywords, target audience, and identified websites. For example, some of the websites targeted by the sponsor may not be optimized for formats associated with the sponsor's goal. The targeting area 240 can identify these websites and suggest other websites that are optimized for the formats. The sponsor can iteratively change the targeting information in the targeting area 240 (and receive additional suggestions) so as to satisfy the sponsor's format-based optimizing goal and generate the sponsor's desired number of views or other engagements.

The targeting area 240 includes options 250 from which the sponsor can identify the type of targeting data to be updated in the targeting area 240. As an example, if the sponsor selects the "Keywords" option 250, then a keyword entry box 252 can appear. The sponsor can enter the keyword "car," for example, to target content items of the campaign to users who may be interested in cars. Other controls and/or boxes can appear when, for example, the sponsor selects "Audience" or "URL" from the options 250 instead of "Keywords." For example, if "Audience" is selected, then a control can appear by manipulation of which the sponsor can identify the user audience or groups of users to target, e.g., based on demographics (e.g., gender, age), etc. In another example, if "URL" is selected, then a control can appear by which the sponsor can enter or select website names that the sponsor identifies as potential websites to which content items in the campaign are to be targeted.

If the sponsor selects a targeting suggestion generation control 254, the sponsor interface 120 (e.g., using the goal-oriented planning engine) can generate targeting suggestions based on the sponsor's current settings of targeting information (e.g., corresponding to options 250). In the example shown, such a selection results in the display of, suggested keywords 256. In this example, the suggested keywords 256 include the sponsor-identified keyword "car" and other car-related keywords. For example, each of the suggested keywords 256 can include an estimated views 258 value which corresponds to the additional views that the campaign is expected to produce if the corresponding keyword is added (e.g., 10K-20K more views for the keyword "car rental"). Using controls 260 (e.g., checkboxes), the sponsor can select or deselect suggested keywords 256. Based on the current selections of the suggested keywords 256, a total estimated views 262 can identify the total additional views that are estimated to result for the campaign, based on the selected keywords 256 and based on the currently-defined targeting information. When the sponsor is satisfied with the currently-selected suggested keywords 250, the sponsor can select an add control 264. For example, this can result in the selected suggested keywords 256 to be added to the keyword entry box 252.

Additional targeting information areas 266 can include other targeting information from which the sponsor can identify targeting parameters and receive suggestions. For example, placements 268 can identify the current URLs that the sponsor has selected for targeting. The URLs displayed can correspond to URLs for websites that the sponsor can select by selecting the URL option 250 and entering URLs in a URL entry box, e.g., similar to the keyword entry box 252. By selecting an expand control 268, a control can be displayed that lists the URLs included in the placements 268 and their corresponding estimated views (e.g., additional views estimated by including each of the websites in targeting).

An audience display 272, for example, can list the demographic-based targeting information (e.g., males 18-29) that the sponsor can input and update by checking the audience option 250. By selecting an expand control 274, for example, the sponsor can view a list of audiences. In some implementations, each type of demographic listed can identify the additional views that are expected for each group, as well as for groups not currently selected by the sponsor.

In some implementations, additional targeting information areas 266 can include topics 276, contextual themes 278, interests 280, and remarketing lists 282. Each of the additional targeting information areas 266 can include an expand control 284, for example, for displaying estimated additional views for each of the corresponding selections in that area. In some implementations, targeting parameters that the sponsor can identify (and for which the goal-oriented planning engine can provide suggestions) can also include geography (e.g., counties, states, metropolitan areas), language preference (e.g., English speakers), education, household income, and other parameters that represent a portion of a given market.

Figure 3:
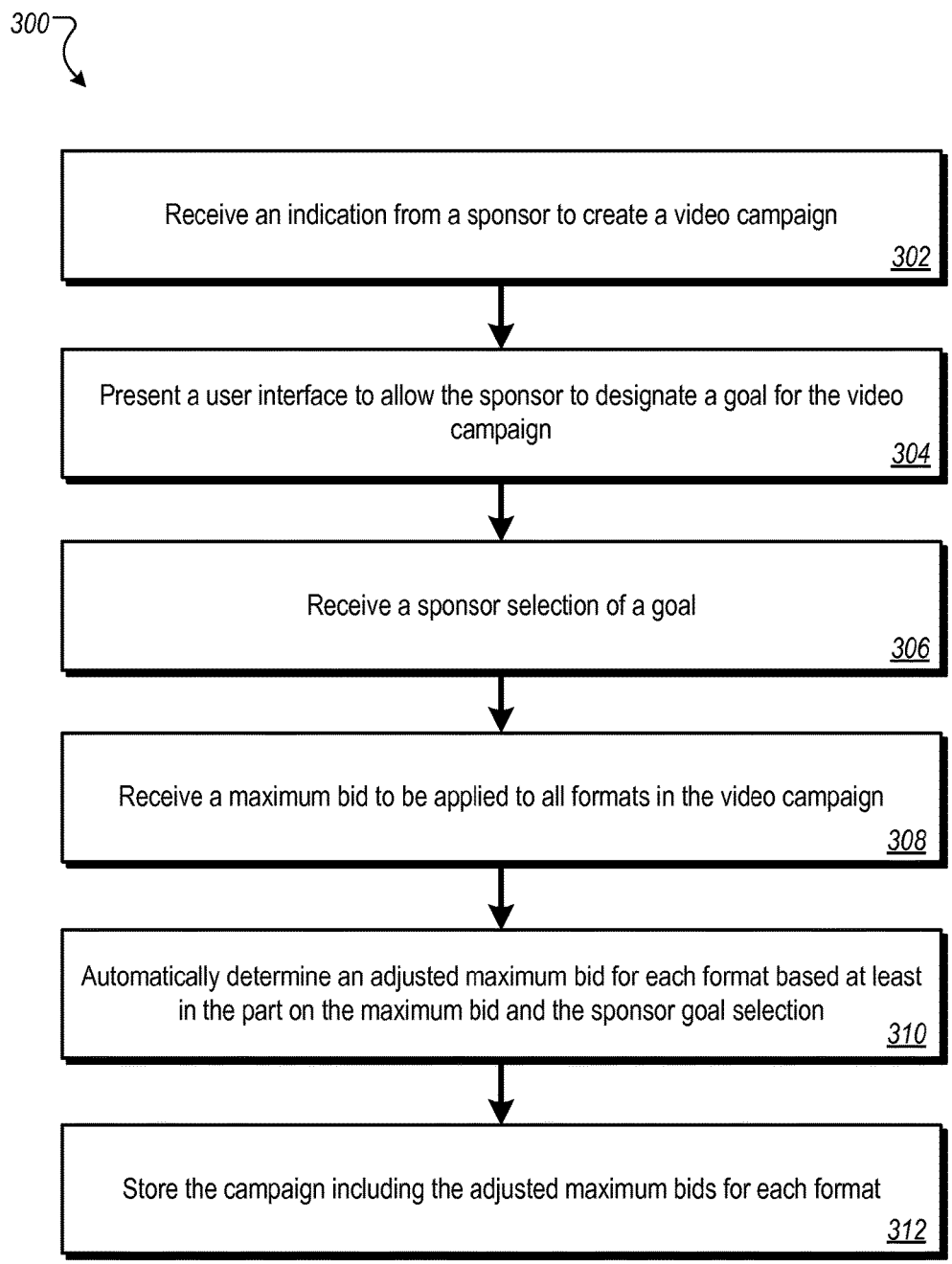
FIG. 3 is a flowchart of an example process using sponsor inputs, including maximizing goals, to provide format-specific bids for video content items.

FIG. 3 is a flowchart of an example process 300 using sponsor inputs, including maximizing goals, to provide format-specific bids for video content items. The process 300 can be performed by the sponsor interface 120. FIGS. 1 and 2 are used to provide examples for steps of the process 300.

An indication is received from a sponsor to create a video campaign (302). For example, a sponsor can select the create new campaign control 208.

A user interface is presented to allow the sponsor to designate a goal for the video campaign (304). In some implementations, the goal is expressed in terms of a balance between maximizing any views and alternatively maximizing engaged views. For example, the sponsor interface 200 can provide the targeting interface 204. As described previously, an engaged view is one that arises when a user indicates their desire to view a video content item or where the user performs one or more actions related to the video content item while or after viewing the video content item.

A sponsor selection of a goal is received (306). For example, the sponsor can use the slider control 232 or some other controls to designate an optimization goal (e.g., that is a balance of views versus engagements).

A maximum bid is received that is to be applied to all formats in the video campaign (308). For example, the sponsor can enter a bid amount in the maximum cost-per-view field 222.

An adjusted maximum bid for each format is automatically determined based at least in the part on the maximum bid and the sponsor goal selection (310). As an example, the sponsor interface 200 can automatically determine bid amounts for the format-specific bids 230. In some implementations, the individual bids are not to exceed the bid amount entered by the sponsor in the maximum cost-per-view field 222. Further, as described above, the bids are optimized based on the sponsor's goal selection indicated by the position on the slider control 232 that is selected by the sponsor.

The campaign is stored including the adjusted maximum bids for each format (312). For example, the sponsor interface can store the campaign, including the optimized bid amounts, in the data store of campaigns and optimized bids 124.

Figure 4:
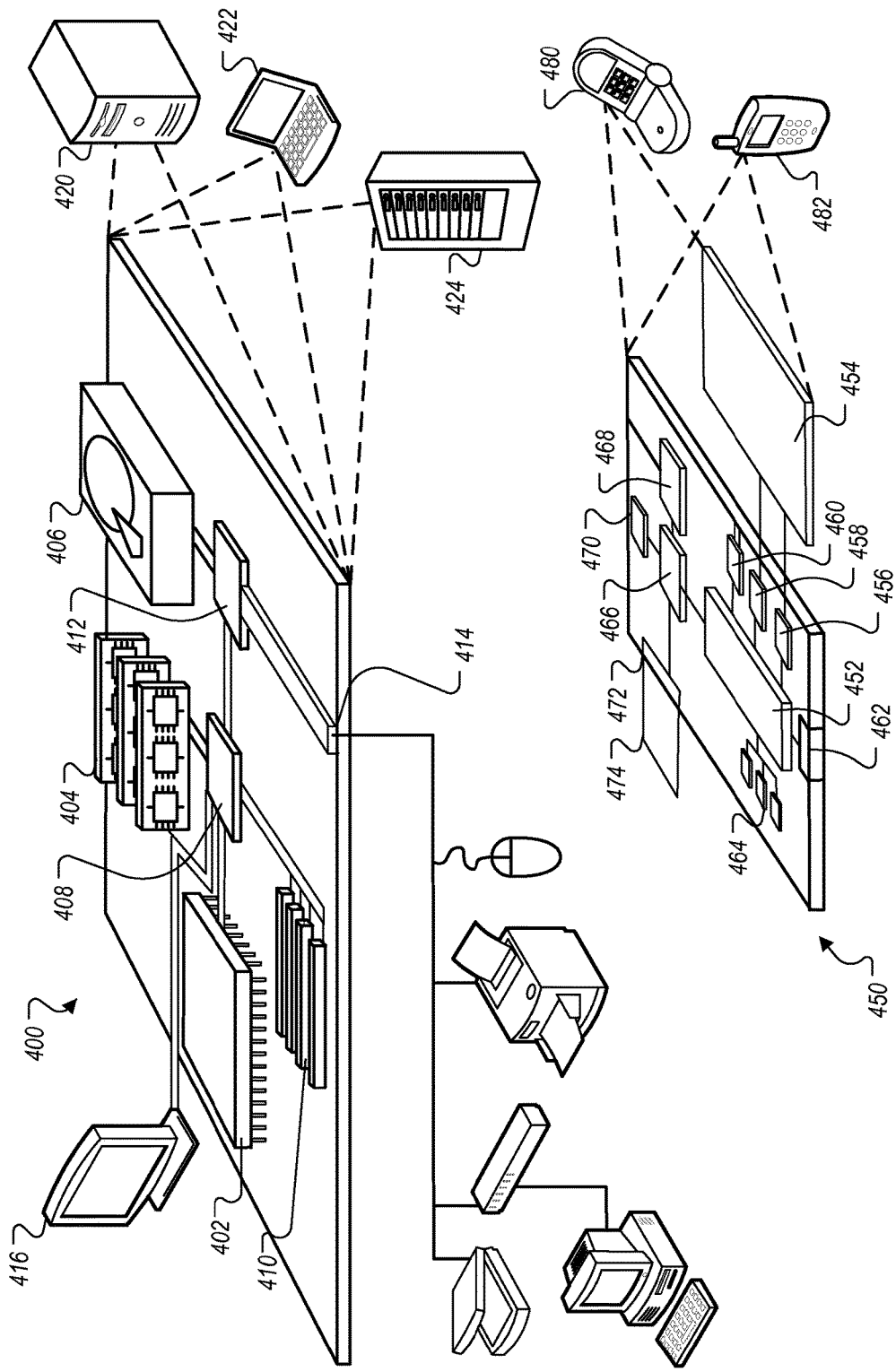
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for displaying market information relating to and facilitating purchasing of content presentation opportunities in an electronic auction-based exchange on a graphical user interface, comprising:
   receiving, by a processing device, an indication from a sponsor to create a video campaign;
   receiving, by the processing device, an input value of a maximum bid price per content presentation opportunity for the video campaign;
   providing, in a graphical user interface by the processing device, a user-adjustable control element consisting of a slider control at a first position along a line between two terminal portions of the line;
   calculating a plurality of format-specific bid prices for a corresponding plurality of presentation types, each of the plurality of format-specific bid prices equal to the input value multiplied by a format-specific adjustment corresponding to the first position of the slider control;
   displaying, in the graphical user interface by the processing device, the plurality of format-specific bid prices for the corresponding plurality of presentation types;
   detecting, via the graphical user interface, an adjustment of the control element from the first position to a second position;
   dynamically recalculating the plurality of format-specific bid prices, by the processing device, each recalculated format-specific bid price equal to the input value multiplied by a second format-specific adjustment corresponding to the second position of the slider control; and
   generating, by the processing device, campaign data for the campaign including the plurality of format-specific bid prices for each format, wherein the campaign data is stored on a storage device.

2. The method of claim 1 further comprising presenting the plurality of format-specific bid prices to the sponsor.

3. The method of claim 2 further comprising presenting controls to enable the sponsor to manually adjust one or more of the dynamically recalculated plurality of format-specific bid prices.

4. The method of claim 3 further comprising receiving sponsor input reflecting a further adjustment to one of the dynamically recalculated plurality of format-specific bid prices and storing the further adjustment in the campaign.

5. The method of claim 4 further comprising presenting a second control element to enable resetting of the further adjustment to the one of the plurality of format-specific bid prices.

6. The method of claim 5 where the second control element is a slider on a second slider control that is used to designate the sponsor's goal.

7. The method of claim 1 further comprising enabling the campaign and targeting content to users based on requests for content in conformance with the campaign and the plurality of format-specific bid prices for each format.

8. The method of claim 1 where the plurality of formats for the campaign include one or more of a search-result-embedded format, a selected-from-group format, an in-display embedded format or an in-stream-embedded format.

9. A system for displaying market information relating to and facilitating purchasing of content presentation opportunities in an electronic auction-based exchange on a graphical user interface, comprising:
   a memory to store campaign data for a video campaign; and a processing device, coupled to the memory, configured to:
  receive an indication from a sponsor to create the video campaign;
  receive an input value of a maximum bid price per content presentation opportunity for the video campaign;
  provide a graphical user interface comprising a user-adjustable control element consisting of a slider control at a first position along a line between two terminal portions of the line;
  calculate a plurality of format-specific bid prices for a corresponding plurality of presentation types, each of the plurality of format-specific bid prices equal to the input value multiplied by a format-specific adjustment corresponding to the first position of the slider control;
  display, in the graphical user interface, the plurality of format-specific bid prices for the corresponding plurality of presentation types;
  detect, via the graphical user interface, an adjustment of the control element from the first position to a second position;
  dynamically recalculate the plurality of format-specific bid prices, each recalculated format-specific bid price equal to the input value multiplied by a second format-specific adjustment corresponding to the second position of the slider control; and
  generate the campaign data for the campaign including the plurality of format-specific bid prices for each format.

10. A non-transitory computer-readable storage medium comprising instructions that, when executed by a processor, perform a method comprising:
  receiving an input value of a maximum bid price per content presentation opportunity for the video campaign;
  providing, in a graphical user interface a user-adjustable control element consisting of a slider control at a first position along a line between two terminal portions of the line;
  calculating a plurality of format-specific bid prices for a corresponding plurality of presentation types, each of the plurality of format-specific bid prices equal to the input value multiplied by a format-specific adjustment corresponding to the first position of the slider control;
  displaying, in the graphical user interface, the plurality of format-specific bid prices for the corresponding plurality of presentation types;
  detecting, via the graphical user interface, an adjustment of the control element from the first position to a second position;
  dynamically recalculating the plurality of format-specific bid prices, each recalculated format-specific bid price equal to the input value multiplied by a second format-specific adjustment corresponding to the second position of the slider control; and
  generating campaign data for the campaign including the adjusted maximum bids for each format, wherein the campaign data is stored on a storage device.

* * * * *